No. 736,688. Patented August 18, 1903.

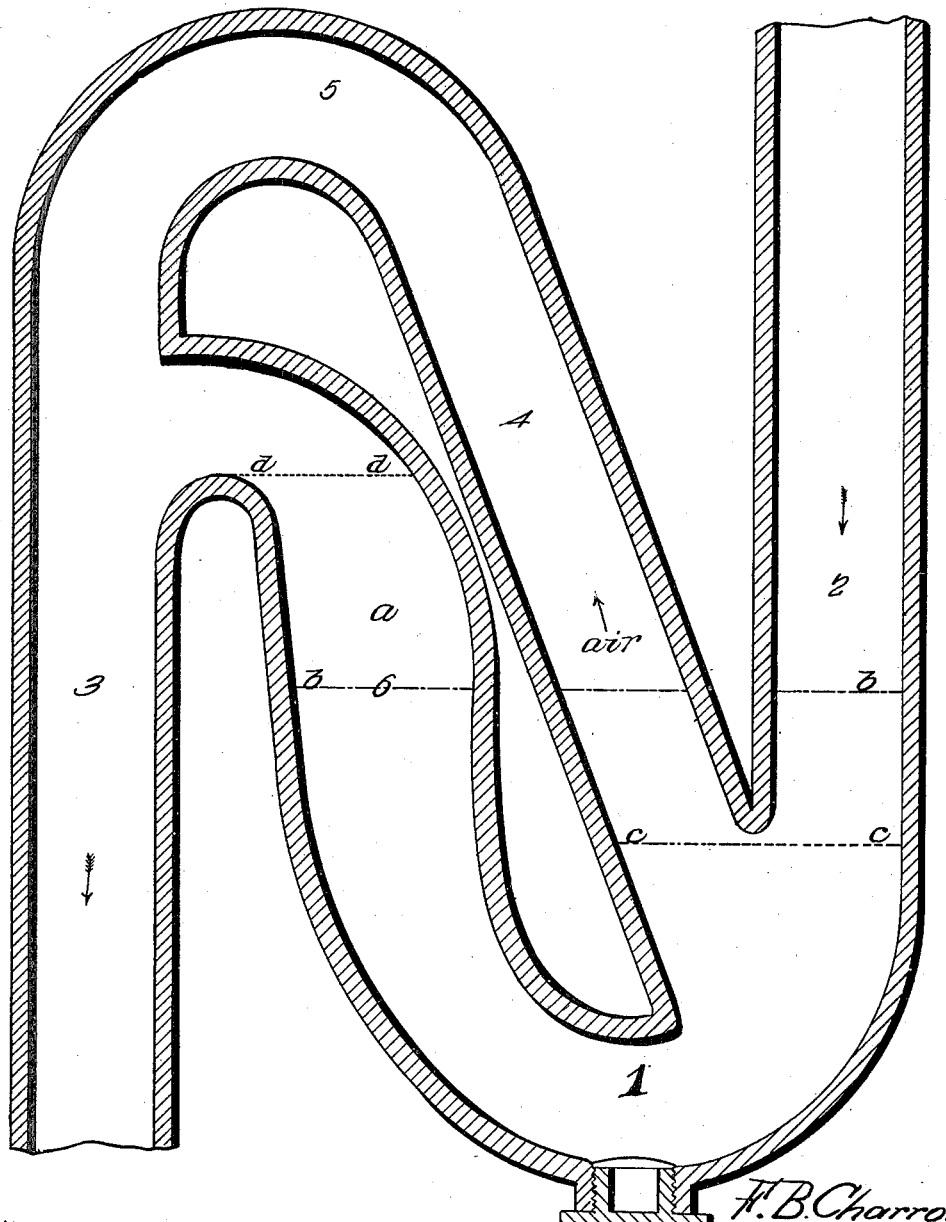

UNITED STATES PATENT OFFICE.

FRANK BRYAN CHARROIN, OF FAIRHAVEN, WASHINGTON.

WATER-TRAP FOR WASTE-PIPES.

SPECIFICATION forming part of Letters Patent No. 736,688, dated August 18, 1903.

Application filed December 23, 1901. Serial No. 86,963. (No model.)

*To all whom it may concern:*

Be it known that I, FRANK BRYAN CHARROIN, a citizen of the United States, residing at Fairhaven, in the county of Whatcom and State of Washington, have invented a new and useful Water-Trap for Waste-Pipes, of which the following is a specification.

My invention is an improved water-trap for waste-pipes and other connections, the object of my invention being to provide a water-trap with means to prevent siphonic action therein and the breaking of the water seal; and my invention consists in the peculiar construction and combination of devices hereinafter fully set forth and claimed.

The accompanying drawing is a vertical sectional view of a water-trap embodying my improvements.

The seal-chamber 1 of my improved water-trap has the intake-leg 2 and the discharge-leg 3. The trap is of such construction that a water seal is normally maintained in the seal-chamber between the inlet and discharge legs to prevent the passage of sewer-gas through the trap.

An air-passage 4 is formed with the trap and connects the lower end of the intake-leg with the upper end of the discharge-leg, the latter having at its upper end a gooseneck connection 5 with the upper end of said air-passage, and in the event of siphonic action being induced in the trap the said air-passage as soon as the lower end thereof is uncovered by the lowering of the water-level in the intake side of the trap operates to break the siphon and prevent the emptying of the water from the seal-chamber.

The discharge side of the trap consists of the water-passage, which is circumferentially enlarged or bulged intermediate of its ends, thus to cause it to be of greater capacity than the intake side thereof, as is indicated at *a* in the drawing. Hence at the beginning of siphonic action in the trap enough of the water from the seal-chamber is retained in the enlarged discharge side of the trap to reëstablish the water seal and submerge the lower end of the air-passage 4 after the latter has operated to discontinue the siphonic action.

The normal water-level in the seal-chamber of the trap is indicated in the drawing by the line *b b*. The level at which the air-passage becomes efficient to prevent siphonic action in the trap is indicated in the intake leg or side thereof by the line *c c*. It will be understood that the level in the discharge side or leg of the trap will be correspondingly raised to the point indicated by the line *d d* and that owing to the greater capacity of the discharge side of the trap the same will retain a sufficient quantity of water to reëstablish an effective water seal and submerge the lower intake end of the air-passage 4.

It will be observed by reference to the drawing that the lower intake end of the air-passage communicates with one side of the intake-leg of the trap, and hence does not obstruct the same. The upper discharge end of the air-passage communicates with the discharge-leg of the trap at an elevated point, and hence water is prevented from passing through the said air-passage.

Having thus described my invention, I claim—

A water-trap comprising an inlet-leg opening into an expanded seal-chamber, an air-passage disposed at an angle to said inlet-leg, converging with the lower end thereof at one edge and having its opposite edge extended downwardly to form one of the walls of said seal-chamber, the opposite wall of the latter being formed by a downward-curved extension of the outer side of the inlet-leg, an outlet disposed parallel to the inlet-leg and having a gooseneck connection with the air-passage at its upper end and a water-passage connected at its upper end with said outlet-leg below the gooseneck connection and at its lower end with the seal-chamber, said water-passage being peripherally swelled to increase its capacity above its point of connection with the seal-chamber.

In testimony that I claim the foregoing as my own I have hereto affixed my signature in the presence of two witnesses.

FRANK BRYAN CHARROIN.

Witnesses:
B. WILLGARD,
R. O. CRAFT.